(12) United States Patent
Tapsak et al.

(10) Patent No.: US 6,534,587 B1
(45) Date of Patent: Mar. 18, 2003

(54) SILALKYLENESILOXANE COPOLYMER MATERIALS AND METHODS FOR THEIR PREPARATION

(75) Inventors: Mark A. Tapsak, St. Anthony; Edward Di Domenico, Anoka, both of MN (US)

(73) Assignee: Medtronic, Inc, Minneapolis, MN (US)

( * ) Notice: Subject to any disclaimer, the term of this patent is extended or adjusted under 35 U.S.C. 154(b) by 0 days.

(21) Appl. No.: 09/568,200

(22) Filed: May 9, 2000

Related U.S. Application Data

(63) Continuation of application No. 09/103,879, filed on Jun. 24, 1998, now Pat. No. 6,080,829.

(51) Int. Cl.[7] .......................... C08L 83/14; C08L 83/07
(52) U.S. Cl. .......................... 524/588; 528/12; 528/14; 528/18; 528/35; 528/37; 556/431; 556/433; 556/434; 556/435; 556/464; 427/2.24; 606/1; 523/105
(58) Field of Search .......................... 528/12, 14, 18, 528/35, 37; 556/434, 435, 431, 433, 464; 524/588; 523/135; 606/1; 427/2.28

(56) References Cited

U.S. PATENT DOCUMENTS

| | | | |
|---|---|---|---|
| 3,452,071 A | | 6/1969 | Sporck .................. 556/434 |
| 5,117,025 A | | 5/1992 | Takago et al. |
| 5,239,034 A | * | 8/1993 | Takago et al. ................. 528/15 |
| 5,241,034 A | | 8/1993 | Herzig et al. |
| 5,386,007 A | | 1/1995 | Herzig et al. |
| 5,386,049 A | * | 1/1995 | Kishita et al. ............... 556/434 |
| 5,442,083 A | * | 8/1995 | Kobayashi .................. 556/434 |
| 5,484,868 A | | 1/1996 | Kobayashi |
| 5,516,832 A | | 5/1996 | Kennan et al. |
| 5,525,696 A | | 6/1996 | Herzig et al. |
| 5,531,929 A | * | 7/1996 | Kobayashi .................. 252/321 |
| 5,581,008 A | * | 12/1996 | Kobayashi .................. 556/434 |
| 5,583,095 A | * | 12/1996 | Kobayashi et al. ......... 508/207 |
| 5,696,211 A | | 12/1997 | Chung et al. |
| 5,703,190 A | | 12/1997 | Dauth et al. |

FOREIGN PATENT DOCUMENTS

| | | |
|---|---|---|
| EP | 0 709 403 A1 | 5/1996 |
| FR | 2686610 | 7/1993 |
| WO | 96/20964 | 7/1996 |
| WO | 96/35732 | 11/1996 |

OTHER PUBLICATIONS

Andrianov et al., "Polymerization of 2,2,6,6–Tetramethyl–1–Oxa–2, 6–Disilacyclohexane", *Institute of Neteroorganic Compounds*, pp. 661, Translated from *Izvestiya Akademii Nauk SSSR, Seriya Khimicheskaya*, 4, pp. 739–744 (Apr. 1971).

Benouargha et al., "Hybrid Silalkylene Polysiloxanes: Synthesis and Thermal Properties", *Eur. Polym. J.*, 33, pp. 1117–1124 (1997).

Cundy et al., "Organometallic Complexes with Silicon–Transition Metal or Silicon–Carbon–Transition Metal Bonds", *Advances in Organometallic Chemistry*, Academic Press, New York (1973), pp. 253–311.

Dvornic et al., "Polymerization by Hydrosilation. 2. Preparation and Characterization of High Molecular Weight Poly[(1,1,3,3–tetramethyldisiloxanyl)ethylene] from 1,3–Dihydridotetramethyldisiloxane and 1,3–Divinyltetramethyldisiloxane", *Macromolecules*, 27, pp. 7575–7580 (1994).

Harrod et al., "Hydrosilation Catalyzed by Group VII Complexes", *Organic Synthesies via Metal Carbonyls*, John Wiley & Sons, New York (1977), pp. 673–705.

Marciniec et al., *Comprehensive Handbook on Hydrosilylation*, Pergamon Press, Ltd; Tarrytown, New York; 1992; pp. 35–38.

Odian, *Principles of Polymerization*, John Wiley & Sons, New York (1981), pp. 44–45 and 82–87.

Speier, "Homogeneous Catalysis of Hydrosilation by Transition Metals", *Advances in Organomettalic Chemistry*, Academic Press, New York (1979), pp. 407–447.

\* cited by examiner

*Primary Examiner*—Robert Dawson
*Assistant Examiner*—Jeffrey B. Robertson
(74) *Attorney, Agent, or Firm*—Thomas Berry; Kenneth Collier; Girma Wolde-Michael

(57) ABSTRACT

Symmetric and asymmetric cyclic silalkylenesiloxane monomers and copolymers thereof, as well as crosslinked and/or reinforced silalkylenesiloxane copolymers, medical devices containing such materials, and methods of preparation.

17 Claims, No Drawings

SILALKYLENESILOXANE COPOLYMER MATERIALS AND METHODS FOR THEIR PREPARATION

This application is a continuation of application Ser. No. 09/103,879 FILED Jun. 24, 1998 now U.S. Pat No. 6,080,829.

BACKGROUND OF THE INVENTION

Silicones (i.e., organosiloxanes) are polymers containing alternating silicon and oxygen atoms in the backbone with various organic groups attached to the silicon atoms. Silalkylenesiloxane copolymers include alkylene backbone units without unsaturation and also include monovalent hydrocarbon groups attached to silicone atoms. Both silicones and silalkylenesiloxanes are useful materials for a wide variety of applications (e.g., rubbers, adhesives, sealing agents, release coatings, antifoam agents). Because of their biocompatibility, silicones present a low risk of unfavorable biological reactions and have therefore gained the medical industry's recognition. Such materials are useful in a wide variety of medical devices. There are, however, limited materials available for medical device applications. In addition, there is a need for improved silicone materials that can be used in the medical industry, particularly those with good strength and tear resistance.

Prior to the present invention, silalkylenesiloxane copolymers have been prepared by three methods. Ring opening polymerization of cyclic silethylenesiloxane is disclosed in U.S. Pat. No. 5,117,025 (Takago et al.). Condensation polymerization of silanol terminated silalkylene oligomers is disclosed in U.S. Pat. No. 5,386,049 (Kishita et al.). Step growth hydrosilylation polymerization between a hydride terminated organosiloxane and an unsaturated aliphatic hydrocarbon that contains 2 carbon-carbon double bonds or one carbon-carbon double bond and one carbon-carbon triple bond is disclosed in U.S. Pat. No. 5,442,083 (Kobayashi).

U.S. Pat. No. 5,442,083 (Kobayashi) states that the ring opening polymerization of cyclic silethylenesiloxane is not advantagous for producing silalkylenesiloxane copolymers. As reported in Andrianov et al., *Inst. Of Heteroorganic Cpds.*, p. 661, translated from *Izvestiya Akademii Nauk SSSR, Seriya Khimicheskaya*, No. 4, pp. 739–44 (1971), a partial depolymerization occurs in this method, which therefore leads to reduced yields of the silalkylenesiloxane copolymer.

Step growth condensation polymerization of silanol terminated fluids yields copolymers that have silanol end groups. To make the copolymer end-functional, for example, vinyldimethylsilyl terminated, another synthetic step is required. This is a disadvantage. In addition, degrees of polymerization (Dp) from step growth silanol condensation polymerizations of disilanolsilalkylene compounds have been reported to be no greater than 180. See, U.S. Pat. No. 5,386,049 (Kishita et al.) and Benouargha et al., *Eur. Polym. J.*, 33, p. 1117 (1997). This is a disadvantage.

Hydrosilylation step growth polymerization as a method of silalkylenesiloxane copolymer synthesis also contains inherent disadvantages. In order to produce high Dp copolymer, the stoichiometry of the silylhydride and unsaturated hydrocarbon moieties must be as close to 1:1 as possible. Side reactions which disturb this balance limit the Dp of said copolymer by creating terminating groups on unsaturated hydrocarbon monomers. For example, it is known in the art that transition metal catalysts typically used for hydrosilylation reactions can cause the isomerization of a terminal carbon-carbon double bond to an internal position. See, Harrod et al., *Organic Synthesis via Metal Carbonyls*, 2, John Wiley & Sons, New York, p. 673 (1977), Cundy et al., *Adv. Organometallic Chem.*, 2, p. 253 (1973), and Speier, *Adv. Organometallic Chem.*, 17, p. 407 (1979). This is a disadvantage. This isomerization renders the monomers less suceptible to hydrosilylation.

Silalkylenesiloxane copolymers having a Dp as high as 10,000 are disclosed in U.S. Pat. No. 5,484,868 (Kobayashi). However, step growth hydrosilylation polymerization was the method used to produce the copolymers and no examples were provided which would circumvent the disadvantages outlined above.

The following lists of documents disclose information regarding siloxane compounds.

TABLE 1a

| Patents | | |
|---|---|---|
| U.S. Pat. No. | Inventor(s) | Issue Date |
| 5,117,025 | Takago et al. | 05/26/92 |
| 5,239,034 | Takago et al. | 08/24/93 |
| 5,241,034 | Herzig et al. | 08/31/93 |
| 5,386,007 | Herzig et al. | 01/31/95 |
| 5,386,049 | Kishita et al. | 01/31/95 |
| 5,442,083 | Kobayashi | 08/15/95 |
| 5,484,868 | Kobayashi | 01/16/96 |
| 5,516,832 | Kennan et al. | 05/14/96 |
| 5,525,696 | Herzig et al. | 06/11/96 |
| 5,531,929 | Kobayashi | 07/02/96 |
| 5,581,008 | Kobayashi | 12/03/96 |
| 5,696,211 | Chung et al. | 12/09/97 |
| 5,703,190 | Dauth et al. | 12/30/97 |

TABLE 1b

| Non-U.S. Patents | | |
|---|---|---|
| Patent No. | Country | Publication Date |
| EP 0 709 403 A1 | EPO | 05/01/96 |
| WO 96/20964 | PCT | 07/11/96 |
| WO 96/35732 | PCT | 11/14/96 |

TABLE 1c.

Nonpatent Documents

Andrianov et al., "Polymerization of 2,2,6,6-Tetramethyl-1-oxa-2,6-disilacyclohexane," Inst. of Heteroorganic Cpds., p. 661, Translated from Izvestiva Akademii Nauk SSSR, Seriya Khimicheskava, No. 4, pp. 739–44 (1971)

Benouargha et al., "Hybrid Silalkylene Polysiloxanes: Synthesis and Thermal Properties", Eur. Polym. J., 33, pp. 1117–1124 (1997).

Cundy et al., "Organometallic Complexes with Silicon-Transition Metal or Silicon-Carbon-Transition Metal Bonds", Advances in Organometallic Chemistry, Academic Press, New York (1973), pp. 253–311.

Dvornic et al., "Polymerization by Hydrosilation. 2. Preparation and Characterization of High Molecular Weight Poly[(1,1,3,3-tetramethyldisiloxanyl)ethylene] from 1,3-Dihydridotetramethyldisiloxane and 1,3-Divinyltetramethyldisiloxane", Macromolecules, 27, pp. 7575–7580 (1994).

Harrod et al., "Hydrosilation Catalyzed by Group VII Complexes", Organic Synthesies via Metal Carbonyls, John Wiley & Sons, New York (1977), pp. 673–705.

Marciniec et al., Comprehensive Handbook on Hydrosilylation, Pergamon Press, Ltd; Tarrytown, New York; 1992; pp. 35–38.

Odian, Principles of Polymerization, John Wiley & Sons, New York (1981), pages 82–87.

TABLE 1c.-continued

Nonpatent Documents

Speier, "Homogeneous Catalysis of Hydrosilation by Transition Metals", Advances in Organometallic Chemistry, Academic Press, New York (1979), pp.407–447.

All patents, patent applications, and publications listed above are incorporated by reference in their respective entireties. As those of ordinary skill in the art will appreciate readily upon reading the application, certain of the information disclosed in the above-listed documents may be utilized in the monomers, polymers, their preparation methods, and the devices disclosed and claimed herein.

SUMMARY OF THE INVENTION

The present invention has certain objects. That is, various embodiments of the present invention provide solutions and advantages to one or more of the problems existing in the prior art with respect to the preparation and properties of siloxanes, and particularly, silalkylenesiloxanes. Certain of these problems are discussed above. The materials and methods of the present invention address one or more of these problems.

The present invention provides symmetric cyclic silalkylenesiloxane monomers having the following formula:

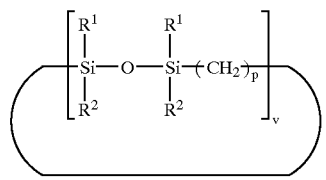

wherein p is at least 6, and v is at least 1, and each $R^1$ and $R^2$ group is independently a monovalent organic group. Alternatively, the present invention provides such monomers wherein p is at least 2 and v is at least 2. Such symmetric monomers include the same value for p in each repeat unit.

The present invention also provides asymmetric cyclic silalkylenesiloxane monomers having the following formula:

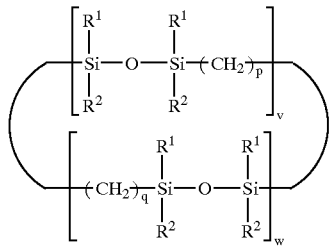

wherein p and q are each at least 2, v and w are each at least 1, with the proviso that q does not equal p for at least one set of silalkylenesiloxane repeat units, and each $R^1$ and $R^2$ group is independently a monovalent organic group. Such asymmetric monomers can include values for p that are the same or different in the various repeat units, and values for q that are the same or different in the various repeat units.

The present invention also provides silalkylenesiloxane copolymers of the formula:

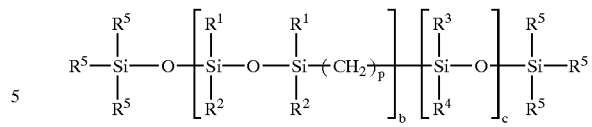

wherein p is at least 2, b is at least 1, the sum of b and c is greater than 300, and each R group is independently a monovalent organic group. These copolymers can be crosslinked and/or reinforced with a silica filler. Preferably, they are both crosslinked and reinforced.

In one embodiment, the reinforced crosslinked material of the present invention is preparable from a silica filler and a crosslinked silalkylenesiloxane copolymer of the formula:

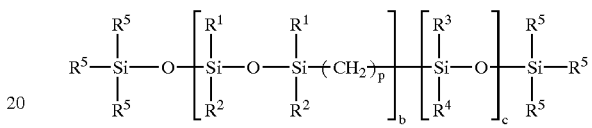

wherein p is at least 6, b is at least 1, c is zero or greater, and each R group is independently a monovalent organic group.

The present invention also provides a medical device comprising a silalkylenesiloxane copolymer of the formula:

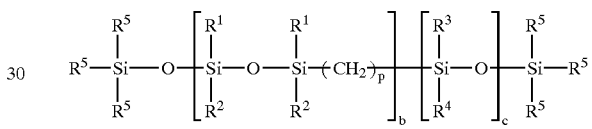

wherein p is at least 2, b is at least 1, c is zero or greater, and each R group is independently a monovalent organic group. Preferably, this material is crosslinked, and more preferably, it is crosslinked and compounded with a silica filler.

The present invention also provides methods of making silalkylenesiloxane copolymers of the present invention. In one embodiment, a method involves combining at least one cyclic silalkylenesiloxane monomer with a catalyst. In another embodiment, a method involves combining at least one compound having at least one silalkylenesiloxane unit and at least one compound having at least one siloxane unit with a catalyst. Preferably, the starting compounds (silalkylenesiloxanes and siloxanes) can be linear or cyclic and the catalyst can be acidic or basic.

Herein, the values for the variables in the formulas are integers; however, they can be average values if the formulas represent average structures, such as occurs with polymers.

As used herein, the term "copolymer" refers to polymers having two or more different repeat units and includes copolymers, terpolymers, tetrapolymers, etc.

As used herein, the term "organic group" means a hydrocarbon group that is classified as an aliphatic group, cyclic group, or combination of aliphatic and cyclic groups (e.g., alkaryl and aralkyl groups). In the context of the present invention, the term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "cyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

As is well understood in this technical area, a large degree of substitution is not only tolerated, but is often advisable. Substitution is anticipated on the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, or S atoms, for example, in the chain as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

DETAILED DESCRIPTION OF PREFERRED EMBODIMENTS

The present invention provides cyclic silalkylenesiloxane monomers that can be preferably polymerized using ring opening polymerization either alone or in the presence of siloxane monomers to yield silalkylenesiloxane random and block copolymers. This methodology facilitates high degrees of polymerization since the cyclic silalkylenesiloxane monomers can be easily purified and the ring opening polymerization is efficient. Alternatively, the polymers of the present invention can be prepared by coequilibrating mixtures of cyclic and linear species.

The copolymerization reactions preferably utilize similar chemistry as that known in the art for silicone materials to yield copolymers having various functionality pendant and/or terminal to the polymer backbone. Pendant and/or terminally functional silalkylenesiloxane copolymers are believed to be useful as elastomers, adhesives, and sealing agents. Such copolymers are capable of being crosslinked. The crosslinked materials are believed to be suitable for a variety of applications, including, elastomers, adhesives, sealing agents, and the like. They are believed to be particularly suitable for use in medical devices.

As used herein, medical device refers to a device that has surfaces that contact tissue, blood, or other bodily fluids in the course of their operation, which fluids are subsequently used in patients. This can include, for example, extracorporeal devices for use in surgery such as blood oxygenators, blood pumps, blood sensors, tubing used to carry blood and the like which contact blood which is then returned to the patient. This can also include endoprostheses implanted in blood contact in a human or animal body such as vascular grafts, stents, pacemaker leads, heart valves, and the like that are implanted in blood vessels or in the heart. This can also include devices for temporary intravascular use such as catheters, guide wires, and the like which are placed into the blood vessels or the heart for purposes of monitoring or repair.

Cyclic Silalkylenesiloxane Monomers

Silalkylenesiloxane cyclic monomers are made by first preparing a silalkylenesiloxane copolymer via hydrosilylation, for example. These copolymers are generally of a relatively low molecular weight (e.g., having a degree of polymerization (Dp) of no greater than about 200) and are not functionalized. Depolymerizing said polymer to cyclic monomers, then purifying by distillation or recrystallization affords monomers that can be polymerized in the presence of linear and/or cyclosiloxane monomers. By this method, a variety of functionality can be incorporated pendant or terminal to the silalkylenesiloxane copolymers. Also, higher molecular weight silalkylenesiloxane copolymers (e.g., having a Dp of greater than about 300) can be prepared.

Specifically, alternating silalkylenesiloxane copolymer starting materials can be prepared by polymerizing a dihydrodisiloxane with an α,ω-alkadiene, as represented by the following scheme:

Scheme 1

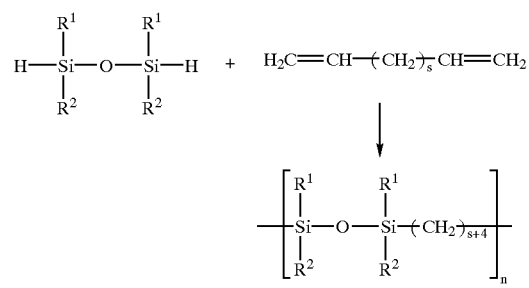

wherein s is at least 2, and preferably no greater than 26, and n is at least 1, and preferably no greater than 200. Each $R^1$ and $R^2$ group is independently (i.e., they may be the same or different) a monovalent organic group (preferably, a $C_1$–$C_{30}$ organic group). Preferably, $R^1$ and $R^2$ are independently methyl, ethyl, propyl, or other alkyl group; phenyl, tolyl, xylyl, or other aryl group; benzyl, phenethyl, or other aralkyl group. These groups may be substituted in part or in total (i.e., such that all the hydrogen atoms are replaced) with various groups, such as halogen atoms. More preferably, $R^1$ and $R^2$ are $C_1$–$C_4$ alkyl groups, and most preferably, methyl moieties.

Alternating silalkylenesiloxane copolymer starting materials may also be prepared by polymerizing a dihydrodisiloxane with an α,ω-alkadienedisiloxane, as represented by the following scheme:

Scheme 2

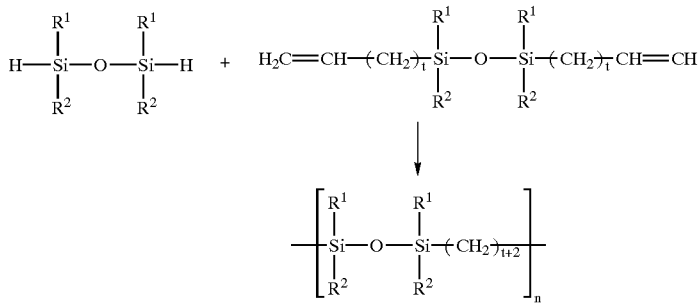

wherein $R^1$, $R^2$, and n are as described above, t is zero or greater, and preferably, zero to 6, most preferably zero to 1.

Transition metal compounds that catalyze hydrosilylation reactions may be used to catalyze the above reactions. Preferred catalysts include, but are not limited to, platinum 1,3-divinyl-1,1,3,3-tetramethyldisiloxane complex and platinum 1,3,5,7-tetravinyl-1,3,5,7-tetramethylcyclotetrasiloxane complex. The addition polymerization is preferably carried out at a temperature slightly under the reflux temperature of the reactants in the absence of any solvent. During the course of the reaction, the temperature may be raised since the intermediate silalkylenesiloxane structures (e.g., dimer, trimer, tetramer, etc.) have a higher boiling point than the starting reactants. The ratio of reactants is typically 1:1 to afford polymer.

Generally, the silalkylenesiloxane copolymer starting materials are of the following formula:

Formula 1

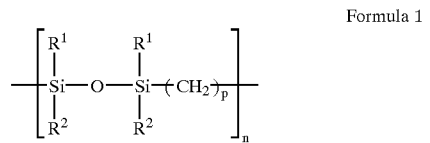

wherein $R^1$ and $R^2$ are as described above, p is at least 2, and n is at least 1. Preferably, p is at least 6 and n is at least 100. More preferably, p is no greater than 30 and n is no greater than 300. Such materials are suitable for preparing cyclic monomers as described below. The repeat unit in formula 1 is referred to herein as a silalkylenesiloxane unit, wherein "alkylene" refers to the hydrocarbon chain in the backbone.

In addition, asymmetric silalkylenesiloxane copolymer starting materials can be produced when mixtures of α,ω-alkadienes and/or α,ω-alkadienedisiloxanes are used in schemes 1 or 2 above. Such silalkylenesiloxane copolymers are of the following general formula:

Formula 2

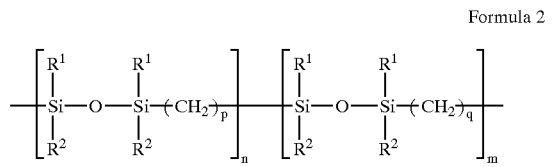

wherein $R^1$, $R^2$, p, and n are as described above, q is at least 2 and m is at least 1, with the proviso that q does not equal p for at least one set of silalkylenesiloxane repeat units. Preferably, q is at least 6 and m is at least 100. More preferably, q is no greater than 30 and m is no greater than 300. Such materials can include various asymmetric polymers wherein the values for p can be the same or different throughout the various repeat units, and the values for q can be the same or different throughout the various repeat units. Such materials are suitable for preparing cyclic monomers as described below.

The silalkylenesiloxane copolymer starting materials as shown above can be depolymerized under vacuum with heat and a base to produce mixtures of cyclic monomers. Either an alkali metal hydroxide such as potassium hydroxide or alkali metal silanolate such as potassium trimethylsilanoate can be used to perform the copolymer cracking. Sufficient temperature and vacuum are used in order to remove cyclic silalkylenesiloxane monomers by distillation so as to continually drive the depolymerization equilibrium. Pot temperatures as high as 300° C. and vacuum as low as 20 mTorr are typically used to distill the large cyclic rings away from the copolymer.

The copolymers described above can be depolymerized without removal of the platinum or transition metal catalyst. However, under the conditions of the depolymerization reaction, such catalysts can promote degradation of the polymer, which leads to copolymer crosslinking. This, therefore, reduces the yield of cyclic monomer produced. Higher yields are obtainable when the residual catalyst is removed.

Such symmetric cyclic silalkylenesiloxane monomers of the present invention are of the following general formula:

Formula 3

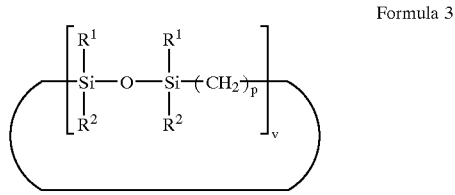

wherein $R^1$, $R^2$, and p are as defined above, v is at least one. Preferably, v is no greater than 3. For certain preferred embodiments, p is at least 2 when v is at least 2.

Silalkylenesiloxane monomers of the present invention are not limited to symmetrical structures. When a mixture of α,ω-alkadienes having different carbon lengths are used to prepare the silalkylenesiloxane copolymer via hydrosilylation, for example, a copolymer as previously described in formula 2, can be depolymerized to a mixture of asymmetric compounds. Such asymmetric silalkylenesiloxane monomers of the present invention are of the following general formula:

Formula 4

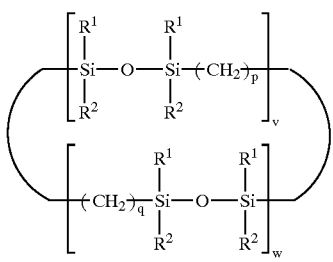

wherein $R^1$, $R^2$, p, q, and v are defined as above, w is at least 1. Preferably, w is no greater than 3. More preferably, the sum of v and w is no greater than 3. Such materials can include various asymmetric cyclic monomers wherein the values for p can be the same or different in the various repeat units, and the values for q can be the same or different in the various repeat units. Again, q does not equal p for at least one set of silalkylenesiloxane repeat units.

The cyclic silalkylenesiloxane monomers can be purified by distillation and/or recrystallization from polar solvents, such as ethanol, for example. Preferably, they are purified before preparing the silalkylenesiloxane copolymers of the present invention as described below.

Silalkylenesiloxane Copolymers

Cyclic silalkylenesiloxane monomers can be polymerized using methods that are similar to those used for cyclic siloxanes. For example, depending upon the ring size, the cyclic silalkylenesiloxane monomers can undergo ring opening reactions under either anionic and cationic catalysis. The anionic polymerization of cyclic silalkylenesiloxane monomers can be initiated by alkali metal oxides and hydroxides, silanolates and other bases, preferably, potassium hydroxide and potassium trimethylsilanoate. Alternatively, cationic polymerization can be initiated by protonic and Lewis acids, preferably triflic acid and strongly acidic ion-exchange resins.

Typically, both anionic and cationic ring opening polymerizations (ROP) may be performed without the use of solvents. However, in order to deliver well-controlled amounts of catalyst to reaction mixtures, solvents such as toluene may be used to dilute said catalyst. Both the anionic and cationic catalyzed equilibration reaction conditions (e.g., time and temperature) are similar to those known in the art for ROP of cyclic organosiloxanes. For example, the triflic acid catalyzed ROP of cyclic silalkylenesiloxane monomers typically requires a catalyst concentration of about $[7\times10^{-4}]$ to about $[5\times10^{-3}]$ and, once added to the cyclic monomer mixture, the equilibration reaction is complete within about 30 minutes to several hours.

The ability to prepare highly pure cyclic silalkylenesiloxane monomers enables the invention herein to produce much higher degrees of polymerization (e.g., Dp values of greater than about 300) than step growth silalkylenesiloxane copolymers previously know in the art. Such silalkylenesiloxane copolymers contain the same structure as defined in formula 1, with the proviso that n is preferably greater than 300. Preferably, n is no greater than 10,000.

The utility of the present invention is particularly appreciated when cyclic silalkylenesiloxane monomers (including mixtures of symmetric and asymmetric cyclic monomers) are copolymerized in the presence of cyclic and/or linear siloxane compounds. A representative synthesis of such copolymers are described, for example, by scheme 3 as follows:

Scheme 3

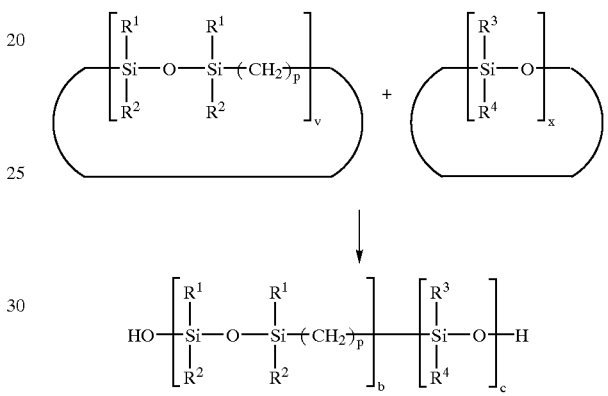

wherein $R^1$, $R^2$, p, and v are as defined above. The value of x is at least 3 and preferably, no greater than 3. The value of c can be zero or greater, although, preferably, it is at least 1, more preferably, at least 3, and most preferably, at least 50. The value of b is at least 1, preferably, 5 at least 50, although more preferably, b is at least equal to C. Preferably, the sum of b and c is no greater than 10,000. Each $R^3$ and $R^4$ group is independently a monovalent organic group (preferably, a $C_1$–$C_{30}$ organic group). Preferably, $R^3$ and $R^4$ are independently methyl, ethyl, propyl, butyl, pentyl, hexyl, or other alkyl group; vinyl or other alkenyl group; phenyl, tolyl, xylyl, or other aryl group; benzyl, phenethyl, or other aralkyl group. These groups may be substituted in part or in total (i.e., such that all the hydrogen atoms are replaced) with various groups, such as halogen atoms, cyano groups, and amino groups. More preferably, $R^3$ and $R^4$ are methyl, phenyl, and vinyl moieties. The resultant copolymers can be random or block copolymers with the value of p being the same or different in the repeat units. Herein, the structural unit containing $R^3$ and $R^4$ groups in the above scheme is referred to as a siloxane unit and the structural unit containing the $R^1$ and $R^2$ groups is referred to as a silalkylenesiloxane unit.

Furthermore, silalkylenesiloxane copolymers containing terminal and/or pendant functional groups can be produced, for example, as shown in scheme 4:

Scheme 4

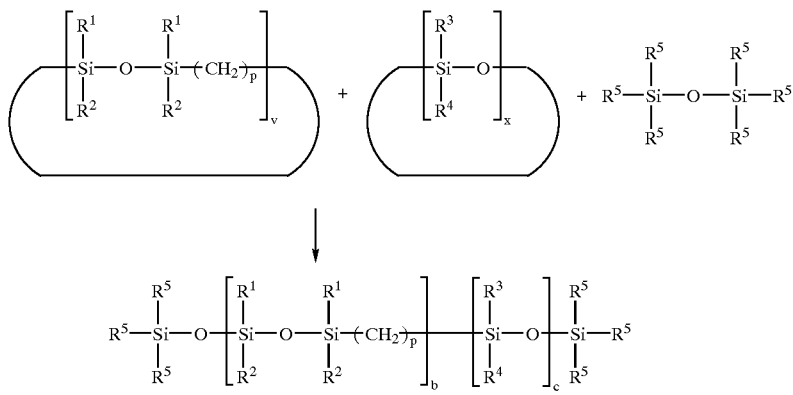

wherein $R^1$, $R^2$, $R^3$, $R^4$, p, v, x, b, and c are as defined above, each $R^5$ group is independently a monovalent organic group (preferably, a $C_1$–$C_{30}$ organic group). Preferably, each $R^5$ is independently methyl, ethyl, propyl, butyl, pentyl, hexyl, or other alkyl group; vinyl, allyl, or other alkenyl group; phenyl, tolyl, xylyl, or other aryl group; benzyl, phenethyl, or other aralkyl group. These groups may be substituted in part or in total (i.e., such that all the hydrogen atoms are replaced) with various groups, such as halogen at oms, cyano groups, amino groups. More preferably, each terminal silyl group includes at least one $R^5$ which is a vinyl moiety. The resultant copolymers can be random or block copolymers with the value of p being the same or different in the repeat units.

Interestingly, the alternating silalkylenesiloxane copolymers containing the structures described by formulas 1 and 2, when crosslinked, do not exhibit reinforcement by treated fumed silica. However, reinforcement and enhanced physical properties are obtained when treated fumed silica is compounded with copolymers containing a siloxane block length of greater than 2 (e.g., wherein c is equal to or greater than b in scheme 4). These preferred functionalized copolymers can be compounded with a silica filler (e.g., fumed silica) and/or crosslinked using similar chemistry as know in the art for silicone rubber.

Preferably, silalkylenesiloxane copolymers of the present invention have the following general formula:

Formula 5

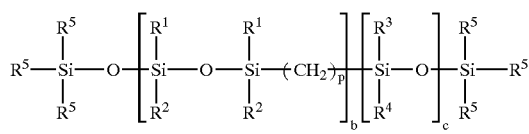

wherein $R^1$, $R^2$, $R^3$, $R^4$, $R^5$, p, b, and c are as defined above. As used herein, this formula represents both random and block copolymers. Such materials can include symmetric polymers and various asymmetric polymers wherein the values for p can be the same or different in the various repeat units.

For certain embodiments of the copolymers in the above formula, p is at least 2 when b is at least 1 and the sum of b and c (which can be referred to as the degree of polymerization or Dp) is greater than 300. For other embodiments of the copolymers, p is at least 2, preferably, at least 6, when b is at least 1 and c is zero or greater.

For certain embodiments of the copolymers in the above formula, one or more of the R groups ($R^1$, $R^2$, $R^3$, $R^4$, and/or $R^5$) include crosslinkable functionalities, such as vinyl, alkoxy, acetoxy, enoxy, oxime, amino, hydroxyl, cyano, halo, acrylate, epoxide, isocyanato groups, etc. For particularly preferred embodiments, copolymers, whether crosslinked or not, are compounded with a silica filler, which typically provides reinforcement and better physical properties for certain applications. For such materials, the sum of b and c (Dp) is preferably 1000 to 5000.

Cyclic silalkylenesiloxane monomers can be polymerized using methods that are similar to those used for cyclic siloxanes, as described above. Alternatively, the above silalkylenesiloxane copolymers may be prepared by coequilibrating mixtures of cyclic and/or linear species. Coequilibrations can be performed under the same anionic or cationic reaction conditions as described above for ROP of silalkylenesiloxane copolymers. For example, a cyclic silalkylenesiloxane monomer as described in formula 3 can be equilibrated with a linear siloxane polymer to yield a silalkylenesiloxane copolymer. In addition, a cyclic siloxane monomer can be equilibrated with a silalkylenesiloxane copolymer to afford a silalkylenesiloxane copolymer having incorporated additional said siloxane units. Alternatively, a linear silalkylenesiloxane copolymer and linear siloxane polymer may be equilibrated together to afford a copolymer which contains a summation of both linear starting reagent units.

Thus, the present invention provides methods for the preparation of silalkylenesiloxane copolymers, which involve the use of cyclic silalkylenesiloxane monomers, particularly those described above. Preferably, the present invention provides a method that involves combining at least one compound having at least one silalkylenesiloxane unit and at least one compound having at least one siloxane unit with a catalyst. The compounds having at least one silalkylenesiloxane unit can be cyclic or linear, preferably, they are cyclic silalkylenesiloxane monomers. The compounds having at least one siloxane unit can be cyclic or linear, preferably, they are cyclic siloxane monomers. The catalysts can be acidic or basic compounds as described above. Thus, as discussed above, the reaction conditions can involve cationic or anionic polymerization.

In order to prepare crosslinked silalkylenesiloxane materials, it is preferred for the copolymers to be functionalized and miscible with the crosslinker. When the alkylene content of a silalkylenesiloxane copolymer is greater than about 15% by weight, the copolymer is not miscible with conventional polysiloxane crosslinking materials. However, if both crosslinking functionalities reside terminal and/or pendent to silalkylenesiloxane copolymers, the materials are typically miscible and will react. For example, the vinyldimethylsilyl terminated silalkylene prepared in Example 4.1 and used within the compounded rubber in Example 5.3 contains 10.6% alkylene by weight. This facilitated the use of a conventional poly(hydromethylsiloxane-co-dimethylsiloxane) crosslinker. However, the vinyidimethylsilyl terminated silalkylenesiloxane copolymers used in Examples 5.1 and 5.2 contained 39% and 29% alkylene by weight, respectively. These copolymers are not misible with conventional poly(hydromethylsiloxane-co-dimethylsiloxane) crosslinker. Therefore, a silalkylenesiloxane copolymer containing hydromethylsiloxane units and containing 30% by weight alkylene units was used to crosslink said materials.

Advantages of the invention are illustrated by the following examples. However, the particular materials and amounts thereof recited in these examples, as well as other conditions and details, are to be interpreted to apply broadly in the art and should not be construed to unduly limit the invention.

EXAMPLES

Materials: Hexadiene, octadiene, and decadiene were purchased from Aldrich, Milwaukee, Wis., were distilled prior to use. 1,1,3,3-Tetramethyldisiloxane was purchased from Gelest, Tullytown, Pa., and was distilled before use. Distillations were performed at ambient pressure through a 90 cm×3 cm mirrored vacuum-jacketed column packed with stainless steel mesh. Hexanes, xylenes, triflic acid, neutral alumina and DOWEX-50W-hydrogen were purchased from Aldrich and were used without further purification. The platinum 1,3-divinyl-1,1,3,3-tetramethyldisiloxane complex and the 1,3,5,7-tetravinyl-1,3,5,7-tetramethyl cyclotetrasiloxane inhibitor were purchased from Gelest and was used without further purification.

Instrumentation: Size exclusion chromatography was performed on a WATERS 150CV and calibrated using narrow molecular weight polydimethylsiloxane standards. Samples were runin toluene at 0.8 ml/min and at 50° C. Differential scanning calorimetry was performed on a PERKIN ELMER DSC7. Infrared spectra were taken on a PERKIN-ELMER 1720 Fourier-Transform Infrared spectrometer running in transmission mode. Samples were placed between potassium bromide windows. Nuclear Magnetic Resonance spectra were performed on a BRUKER 300 MHz/52 MM instrument.

Example 1
Procedure for Preparation of Silalkylenesiloxane Starting Materials for Synthesis of Cyclic Monomers 1.1 Preparation of Copoly(1,3-disiloxanylene-alt-1, 6-hexanylene)

1,5-hexadiene (550 g, 6.7 mol) was added to a three-necked 3 L round-bottomed flask. The flask was fitted with a mechanical stirrer, a thermometer and a 1 L pressure-equalizing dropper funnel. The funnel was charged with 1,1,3,3-tetramethyldisiloxane (900 g, 6.7 mol). In a test tube was mixed xylene (2 ml) and platinum 1,3-divinyl-1,1,3,3-tetramethyidisiloxane complex (5 drops neat), this solution was added to the reaction flask. The 1,1,3,3-tetramethyldisiloxane was then added to the reaction flask dropwise, the addition rate was adjusted to maintain a pot temperature of 70° C. After ¾ of the 1,5-hexadiene was added, the pot temperature was maintained at 100° C. by the use of a heat mantle. The reaction was allowed to run for 24 hours at 100° C. The crude copolymer was diluted 1:1 (v:v) with hexanes, then flashed through a column (9 cm dia.×15 cm) of neutral alumina. An additional liter of hexanes was used to wash the column of any remaining copolymer. Solvents were removed by evaporation under reduced pressure. In this way, 1430 g of crude copolymer $M_w/M_n$=52,000/23,600, $T_g$=−93° C., was obtained. $^1$H NMR (CDCl$_3$, 300 MHz) δ: 0.01 (s, 12H), 0.46–0.51(m, 4H), 1.28(s, 8H). $^{13}$C NMR (CDCl$_3$, 75.5 MHz) δ: 0.38, 18.46, 23.24, 33.21. $^{29}$Si NMR (CDCl$_3$, 60.0 MHz) δ: 7.30. IR ν: 2957, 2921, 2855, 2796, 1588, 1461, 1410, 1342, 1300, 1253, 1191, 1156, 1057, 967, 902, 839, 794, 704, 631, 537 cm$^{-1}$.

1.2 Preparation of Copoly(1,3-disiloxanylene-alt-1, 8-octanylene)

1,7-octadiene (740 g, 6.7 mol) was added to a three-necked 3 L round-bottomed flask. The flask was fitted with a mechanical stirrer, a thermometer and a 1 L pressure-equalizing dropper funnel. The funnel was charged with 1,1,3,3-tetramethyldisiloxane (900 g, 6.7 mol). In a test tube was mixed xylene (2 ml) and platinum 1,3-divinyl-1,1,3,3-tetramethyldisiloxane complex (5 drops neat), this solution was added to the reaction flask. The 1,1,3,3-tetramethyldisiloxane was then added to the reaction flask dropwise, the addition rate was adjusted to maintain a pot temperature of 70° C. After ⅔ of the 1,7-octadiene was added, the pot temperature was maintained at 100° C. by the use of a heat mantle. The reaction was allowed to run for 24 hours at 100° C. The crude copolymer was diluted 1:1 (v:v) with hexanes, then flashed through a column (9 cm dia.×15 cm) of neutral alumina. An additional liter of hexanes was used to wash the column of any remaining copolymer. Solvents were removed by evaporation under reduced pressure. In this way, 1610 g of crude copolymer $M_w/M_n$=46,500/21,400, $T_m$=−15° C., $T_g$=−90° C., was obtained. $^1$H NMR (CDCl$_3$, 300 MHz) δ: 0.01(s, 12H), 0.45–0.50(m, 4H), 1.26(s, 12H). $^{13}$C NMR (CDCl$_3$, 75.5 MHz) δ: 0.40, 18.44, 23.31, 29.38, 33.53. $^{29}$Si NMR (CDCl$_3$, 60.0 MHz) δ: 7.30. IR ν: 2956, 2921, 2854, 2796, 1585, 1463, 1410, 1341, 1253, 1218, 1184, 1158, 1060, 959, 909, 840, 795, 704, 631 cm$^{-1}$.

1.3 Preparation of Copoly(1,3disiloxanylene-alt-1, 10-decanylene)

1,9-decadiene (926 g, 6.7 mol) was added to a three-necked 3 L round-bottomed flask. The flask was fitted with a mechanical stirrer, a thermometer and a 1 L pressure-equalizing dropper funnel. The funnel was charged with 1,1,3,3-tetramethyldisiloxane (900 g, 6.7 mol). In a test tube was mixed xylene (2 ml) and platinum 1,3divinyl-1,1,3,3-tetramethyldisiloxane complex (5 drops neat), this solution was added to the reaction flask. The 1,1,3,3-tetramethyidisiloxane was then added to the reaction flask dropwise, the addition rate was adjusted to maintain a pot temperature of 70° C. After ¾ of the 1 9-decadiene was added, the pot temperature was maintained at 100° C. by the use of a heat mantle. The reaction was allowed to run for 24 hours at 100° C. The crude copolymer was diluted 1:1 (v:v) with hexanes, then flashed through a column (9 cm dia.×18 cm) of neutral alumina. An additional liter of hexanes was used to wash the column of any remaining copolymer. Solvents were removed by evaporation under reduced pressure. In this way, 1790 g of crude copolymer $M_w/M_n$=54, 600/25,600, $T_m$=10° C., $T_g$=−70° C., was obtained. $^1$H NMR (CDCl$_3$, 300 MHz) δ: 0.01(s, 12H), 0.50–0.46(m, 4H), 1.25–1.27(m, 16H). $^{13}$C NMR (CDCl$_3$, 75.5 MHz) δ: 0.40, 18.38, 23.34, 29.68–29.74(m), 33.43. $^{29}$Si NMR (CDCl$_3$, 60.0 MHz) δ: 7.33. IR ν: 2923, 2856, 2679, 1573, 1461, 1440, 1409, 1345, 1253, 1197, 1175, 1158, 1057, 841, 797, 776, 706, 616, 506 cm$^{-1}$.

1.4 Preparation of Copoly(1,3-disiloxanylene-alt-1,14-tetradecanylene)

1,13-tetradecadiene (56 g, 0.29 mol) was added to a three-necked 250 ml round-bottomed flask. The flask was fitted with a TEFLON-coated magnetic stir bar, a thermometer and a 125 ml pressure-equalizing dropper funnel. The funnel was charged with 1,1,3,3-tetramethyldisiloxane (39 g, 0.29 mol). Platinum 1,3-divinyl-1,1,3,3-tetramethyidisiloxane complex (2 drops neat) was added directly to the reaction flask. The 1,1,3,3-tetramethyldisiloxane was then added to the reaction flask dropwise, the addition rate was adjusted to maintain a pot temperature of 100° C. After all of the 1,1 3-tetradecadiene was added, the pot temperature was maintained at 85° C. by a heat mantle. The reaction was allowed to run for at 24 hours at 85° C. In this way, 95 g of crude copolymer $M_w/M_n$=32,200/14,400, $T_m$=24° C., ($T_g$ not observed) was obtained. $^1$H NMR (CDCl$_3$, 300 MHz) δ: 0.01(s, 12H), 0.50–0.45(m, 4H), 1.23–1.29(m, 24H). $^{13}$C NMR (CDCl$_3$, 75.5 MHz) δ: 0.40, 18.43, 23.31, 29.32–29.77(m), 33.49. $^{29}$Si NMR (CDCl$_3$, 60.0 MHz) δ: 7.35. IR ν: 2955, 2923, 2854, 1584, 1465, 1410, 1342, 1253, 1173, 1059, 967, 840, 796, 705, 631, 539 cm$^{-1}$.

1.5 Preparation of Copoly(1,3-disiloxanylene-random-1,14-tetradecanylene-random-1,2-ethanylene)

1,13-tetradecadiene (56 g, 0.29 mol) and 1,3-divinyl-1,1,3,3-tetramethyldisiloxane (20 g, 0.11 mol) is added to a three-necked 250 ml round-bottomed flask. The flask is fitted with a TEFLON-coated magnetic stir bar, a thermometer and a 125 ml pressure-equalizing dropper funnel. The funnel is charged with 1,1,3,3-tetramethyldisiloxane (53.6 g, 0.40 mol). Pt complex (2 drops neat) is then added directly to the reaction flask. The 1,1,3,3-tetramethyidisiloxane is added to the reaction flask dropwise, the addition rate is adjusted to maintain a pot temperature of 100° C. After all of the 1,13-tetradecadiene is added, the pot temperature is held at 85° C. by a heat mantle. The reaction is allowed to run for at 24 hours. The xylene is removed by evaporation under reduced pressure. No analytical information is available.

Example 2
Procedure for Preparation of Cyclic Monomers

2.1 Depolymerization of Copoly(1,3-disiloxanylene-alt-1,6-hexanylene)

Copoly(1,3-disiloxanylene-alt-1,6-hexanylene) (380 g), KOH (1.4 g) and a TEFLON-coated magnetic stir bar was charged to a three-necked 1 L round-bottomed flask. The flask was fitted with a thermometer, a distillation adapter, a glass stopcock and a heat mantle. The distillation adapter was also fitted to a three-necked 1 L round-bottomed receiving flask. A ice water bath is placed under the receiver flask and the distillation adapter is wrapped with heat tape in order to provide more efficient collection of monomers. Cracking was performed under vacuum using both a mechanical and oil diffusion pump. The reaction flask contents were heated to 200° C. and the cracking continued until the remaining copolymer crosslinked. In this way, 230 g, 61% combined yield of both 1,1,3,3-tetramethyl-1,3-disila-2-oxacyclononane and 1,1,3,3,10,10,12,12-octamethyl-1,3,10,12-tetrasila-2,11-dioxacyclooctadecane was obtained.

1,1,3,3-Tetramethyl-1,3-disila-2-oxacyclononane was distilled under vacuum to yield a colorless liquid. $^1$H NMR (CDCl$_3$, 300 MHz) δ: 0.02(s, 12H), 0.48–0.53(m, 4H), 1.33(m, 8H). $^{13}$C NMR (CDCl$_3$, 75.5 MHz) 5: 0.78, 16.12, 21.42, 27.05. $^{29}$Si NMR (CDCl$_3$, 60.0 MHz) δ: 6.14. IR ν: 2946, 2927, 2903, 2865, 2801, 1546, 1457, 1411, 1341, 1253, 1113, 1074, 960, 905, 837, 803, 782, 696, 626, 598 cm$^{-1}$. Elemental Analysis calculated for $C_{10}H_{24}O_1Si_2$: C, 55.49; H, 11.17; Si, 25.95. Found: C, 55.30; H, 11.34; Si, 25.47.

1,1,3,3,10,10,12,12-Octamethyl-1,3,10,12-tetrasila-2,11-dioxacyclooctadecane was recrystalyzed from hot ethanol to yield white crystals, m.p. 48°–50° C. $^1$H NMR (CDCl$_3$, 300 MHz) δ: 0.02(s, 24H), 0.46–0.51(m, 8H), 1.32(s, 16H). $^{13}$C NMR (CDCl$_3$, 75.5 MHz) δ: 0.56, 18.58, 23.15, 33.26. $^{29}$Si NMR (CDCl$_3$, 60.0 MHz) δ: 7.13. IR ν: 2958, 2917, 2854, 1582, 1410, 1253, 1194, 1155, 1069, 968, 890, 844, 796, 709, 651, 629 cm$^{-1}$. Elemental Analysis calculated for $C_{20}H_{48}O_2Si_4$: C, 55.49; H, 11.17; Si, 25.95. Found: C, 55.50; H, 11.49; Si, 25.57.

2.2 Depolymerization of Copoly(1,3-disiloxanylene-alt-1,8-octanylene)

Copoly(1,3-disiloxanylene-alt-1,8octanylene) (380 g), KOH (1.4 g) and a TEFLON-coated magnetic stir bar was charged to a three-necked 1 L round-bottomed flask. The flask was fitted with a thermometer, a distillation adapter, a glass stopcock and a heat mantle. The distillation adapter was also fitted to a three-necked 1 L round-bottomed receiving flask. A ice water bath is placed under the receiver flask and the distillation adapter is wrapped with heat tape in order to provide more efficient collection of monomers. Cracking was performed under vacuum using both a mechanical and oil diffusion pump. The reaction flask contents were heated to 200° C. and the cracking continued until the remaining copolymer crosslinked. In this way, 130 g, 34% combined yield of 1,1,3,3-tetramethyl-1,3-disila-2-oxa-cycloundecane and 1,1,3,3,12,12,14,14-octamethyl-1,3,12,14-tetrasila-2,13-dioxacyclodocosane was obtained.

1,1,3,3-tetramethyl-1,3-disila-2-oxa-cycloundecane was distilled under vacuum to yield a colorless liquid. $^1$H NMR (CDCl$_3$, 300 MHz) δ: 0.02(s, 12H), 0.46–0.51(m, 4H), 1.26–1.33(m, 8H). $^{13}$C NMR (CDCl$_3$, 75.5 MHz) δ: 1.14, 16.04, 20.87, 24.55, 28.59. $^{29}$Si NMR (CDCl$_3$, 60.0 MHz) δ: 7.04. IR ν: 2924, 2859, 1462, 1410, 1341, 1254, 1171, 1051, 970, 839, 796, 703, 645, 600, 507 cm$^{-1}$. Elemental Analysis calculated for $C_{12}H_{28}O_1Si_2$: C, 58.94; H, 11.54; Si, 22.97. Found: C, 59.10; H, 11.78; Si, 21.87.

1,1,3,3,12,12,14,14-octamethyl-1,3,12,14-tetrasila-2,13-dioxacyclodocosane was recrystalyzed from hot ethanol to yield white crystals, m.p. 67°–69° C. $^1$H NMR (CDCl$_3$, 300 MHz) δ: 0.01 (s, 12H), 0.44–0.49(m, 4H), 1.33(m, 8H). $^{13}$C NMR (CDCl$_3$, 75.5 MHz) δ: 0.51, 18.48, 23.28, 29.43, 33.49. $^{29}$Si NMR (CDCl$_3$, 60.0 MHz) δ: 7.12. IR ν: 2958, 2918, 2877, 2853, 1719, 1586, 1467, 1410, 1321, 1252, 1186, 1147, 1067, 1005, 989, 940, 842, 791, 747, 710, 684, 653, 632, 507, 470 cm$^{-1}$. Elemental Analysis calculated for $C_{24}H_{56}O_2Si_4$: C, 58.94; H, 11.54; Si, 22.97. Found: C, 59.00; H, 11.88; Si, 21.99.

2.3 Depolymerization of Copoly(1,3-disiloxanylene-alt-1,10-decanylene)

Copoly(1,3-disiloxanylene-alt-1,10-decanylene) (380 g), KOH (1.4 g) and a TEFLON-coated magnetic stir bar was charged to a three-necked 1 L round-bottomed flask. The flask was fitted with a thermometer, a distillation adapter, a glass stopcock and a heat mantle. The distillation adapter was also fitted to a three-necked 1 L round-bottomed receiving flask. An ice water bath is placed under the receiver flask and the distillation adapter is wrapped with heat tape in order to provide more efficient collection of monomers. Cracking was performed under vacuum using both a mechanical and oil diffusion pump. The reaction flask contents were heated to 200° C. and the cracking continued until the remaining copolymer crosslinked. In this way, 200 g, 53% combined yield of 1,1,3,3-tetramethyl-1,3-disila-2-oxa-cyclotridecane and 1,1,3,3,14,14,16,16-octamethyl-1,3,14,16-tetrasila-2,15-dioxacyclohexacosane was obtained.

1,1,3,3-tetramethyl-1,3-disila-2-oxa-cyclotridecane was distilled under vacuum to yield a colorless liquid. $^1$H NMR (CDCl$_3$, 300 MHz) δ: 0.04(s, 12H), 0.47–0.52(m, 4H), 1.32–1.42(m, 8H). $^{13}$C NMR (CDCl$_3$, 75.5 MHz) δ: 0.88, 17.46, 20.99, 24.74, 25.77, 30.04. $^{29}$Si NMR (CDCl$_3$, 60.0 MHz) δ: 7.04. IR ν: 2924, 2861, 1460, 1409, 1345, 1253, 1196, 1173, 1059, 842, 797, 781, 707 cm$^{-1}$. Elemental Analysis calculated for C$_{14}$H$_{32}$O$_1$Si$_2$: C, 61.69; H, 11.83; Si, 20.61. Found: C, 61.41; H, 12.04; Si, 20.14.

1,1,3,3,14,14,16,16-octamethyl-1,3,14,16-tetrasila-2,15-dioxacyclohexacosane was recrystalyzed from hot ethanol to yield white crystals, m.p. 90° C. $^1$H NMR (CDCl$_3$, 300 MHz) δ: 0.01(s, 12H), 0.45–0.50(m, 4H), 1.26–1.35(m, 8H). $^{13}$C NMR (CDCl$_3$, 75.5 MHz) δ: 0.51, 18.46, 23.30, 29.54, 29.74, 33.44. $^{29}$Si NMR (CDCl$_3$, 60.0 MHz) δ: 7.13. IR ν: 2958, 2920, 2853, 1590, 1468, 1405, 1252, 1221, 1160, 1072, 1007, 965, 848, 796, 702, 633, 507 cm$^{-1}$. Elemental Analysis calculated for C$_{28}$H$_{64}$O$_2$Si$_4$: C, 61.69; H, 11.83; Si, 20.61. Found: C, 61.60; H, 11.86; Si, 19.96.

2.4 Depolymerization of Copoly(1,3-disiloxanylene-alt-1,14-tetradecanylene)

Copoly(1,3-disiloxanylene-alt-1,10-tetradecanylene) (95 g), KOH (0.2 g) and a TEFLON-coated magnetic stir bar was charged to a three-necked 1 L round-bottomed flask. The flask was fitted with a thermometer, a distillation adapter, a glass stopcock and a heat mantle. The distillation adapter was also fitted to a three-necked 1 L round-bottomed receiving flask. A ice water bath is placed under the receiver flask and the distillation adapter is wrapped with heat tape in order to provide more efficient collection of monomers. Cracking was performed under vacuum using both a mechanical and oil diffusion pump. The reaction flask contents were heated to 200° C. and the cracking continued until the remaining copolymer crosslinked. In this way, 29 g, 30% combined yield 1,1,3,3-tetramethyl-1,3-disila-2-oxa-cycloheptadecane and 1,1,3,3,18,18,20,20-octamethyl-1,3,18,20-tetrasila-2,19-dioxacyclotetratriacontane was obtained.

1,1,3,3-tetramethyl-1,3-disila-2-oxa-cycloheptadecane was distilled under vacuum to yield a colorless liquid. $^1$H NMR (CDCl$_3$, 300 MHz) δ: 0.04(s, 12H), 0.48–0.54(m, 4H), 1.27(s, 4H), 1.33(s, 20H). $^{13}$C NMR (CDCl$_3$, 75.5 MHz) δ: 0.41, 18.27, 22.68, 26.36, 27.10, 27.20, 27.52, 32.45. $^{29}$Si NMR (CDCl$_3$, 60.0 MHz) δ: 7.10. IR ν: cm$^{-1}$. Elemental Analysis calculated for C$_{18}$H$_{40}$O$_1$Si$_2$: C, 65.78; H, 12.27; Si, 17.09. Found: C, 65.32; H, 12.58; Si, 17.43.

1,1,3,3,18,18,20,20-octamethyl-1,3,18,20-tetrasila-2,19-dioxacyclotetratriacontane was recrystalyzed from hot ethanol to yield white crystals, m.p. 97° C. $^1$H NMR (CDCl3, 300 MHz) δ: 0.01(s, 24H), 0.45–0.50(m, 8H), 1.24–1.29(m, 48H). $^{13}$C NMR (CDCl$_3$, 75.5 MHz) δ: 0.41, 18.25, 22.71, 26.35, 27.09, 27.22, 27.56, 32.40. $^{29}$Si NMR (CDCl$_3$, 60.0 MHz) δ: 7.16. IR ν: 2958, 2919, 2852, 1587, 1468, 1410, 1305, 1253, 1202, 1175, 1145, 1065, 985, 919, 835, 794, 746, 717, 654, 632, 554, 504, 435 cm$^{-1}$. Elemental Analysis calculated for C$_{36}$H$_{80}$O0$_2$Si$_4$: C, 65.78; H, 12.27; Si, 17.09. Found: C, 65.48; H, 12.35; Si, 16.97.

2.5 Depolymerization of Copoly(1,3-disiloxanylene-random-1,14-tetradecanylene-random-1,2-ethanylene)

Copoly(1,3-disiloxanylene-random-1,14-tetradecanylene-random-1,2-ethanylene) (120 g), KOH (0.44 g) and a TEFLON-coated magnetic stir bar is charged to a three-necked 1 L round-bottomed flask. The flask is fitted with a thermometer, a distillation adapter, a glass stopcock and a heat mantle. The distillation adapter is also fitted to a three-necked 1 L round-bottomed receiving flask. An ice water bath is placed under the receiver flask and the distillation adapter is wrapped with heat tape in order to provide more efficient collection of monomers. Cracking is performed under vacuum using both a mechanical and oil diffusion pumps. The reaction flask contents are heated to 200° C. and the cracking continued until the remaining copolymer crosslinked. In this way, a mixture of asymmetric monomers is obtained. No analytical information is available.

Example 3
Ring Opening Polymerization of Cyclic Silalkylenesiloxane Monomers

3.1 Cationic ROP of Silalkylenesiloxane Monomers

DOWEX-50W-hydrogen acidic ion exchange resin (1.0 g) and a TEFLON coated magnetic stir bar were added to a 50 ml one-necked round-bottomed flask. The flask and its' contents were dried for 4 hours at 100° C. under vacuum. After this time, 1,1,3,3,12,12,-14,14-octamethyl-1,3,12,14-tetrasila-2,13-dioxacyclodocosane (8.0 g) was added to the hot flask. The flask was fitted with a drying tube (DRIERITE) and was heated to 70° C. The flasks' contents rose in viscosity until, after 8 hours, the stir bar was no longer effective. The crude product was diluted with THF (2:1 v,v solvent to polymer) and the DOWEX resin removed by filtration. The polymer was precipitated with methanol. The polymer precipitation from THF/methanol was repeated twice. In this way, 6.6 g, 83% yield of colorless copolymer M$_w$/M$_n$=180,000/82,000, T$_g$=−90° C. was obtained. The analytical data matches that previously described for copoly (1,3-disiloxanylene-alt-1,8-octanylene).

3.2 Cationic ROP of Silalkylenesiloxane Monomers 1,1,3,3,10,10,-12,12-Octamethyl-1,3,10,12-tetrasila-2,11-dioxacyclooctadecane (200 g) and a TEFLON coated magnetic stir bar were added to an oven dried 500 ml three-necked round-bottomed flask. The flask was fitted with two rubber septum, flushed with dry nitrogen and then fitted with a water cooled condenser and drying tube (DRIERITE). Anhydrous toluene (250 ml) was added to the flask via syringe. The reaction mixture was heated to reflux, then triflic acid (70 μl) was added via syringe. The solution turned slightly orange. The reaction was let to run for 24 hours after which the polymer product was precipitated once from THF/methanol. In this way, 190 g, 95% yield of colorless polymer M$_w$/M$_n$546,000/346,000, T$_g$=−93° C. was obtained. The analytical data matches that previously described for copoly(1,3-disiloxanylene-alt-1,6-hexanylene).

3.3 Anionic ROP of Silalkylenesiloxane Monomers 1,1,3,3-Tetramethyl-1,3-disila-2-oxacyclononane (18 g), potassium silanolate/toluene mixture (0.2 ml) and a TEFLON. coated magnetic stir bar were added to an oven dried 250 ml two-necked. round-bottomed flask. The flask was fitted with a rubber septum, flushed with dry nitrogen and then fitted with a drying tube (DRIERITE). The reaction mixture was heated to 140° C. and was let to run for 28 hours. After this time, the polymer product was precipitated twice from THF/methanol. In this way, 16.9 g, 94% yield of colorless polymer $M_w/M_n$=88,700/35,500, $T_g$=−93° C. was obtained. The analytical data matches that previously described for copoly(1,3-disiloxanylene-alt-1,6-hexanylene).

Example 4
Ring Opening Polymerization of Cyclic Silalkylenesiloxane Monomers in the Presence of Silicone Monomers

4.1 Cationic ROP of Monomer and Polymer Mixtures 1,1,3,3-tetramethyl-1,3-disila-2-oxacyclotridecane (80 g), vinyidimethylsilyl terminated polydimethylsiloxane (320 g, DP 2400), anhydrous hexanes (800 ml) and a TEFLON coated magnetic stir bar were added to an oven dried 2 L two-necked round-bottomed flask. The flask was fitted with a rubber septum, flushed with dry nitrogen and then fitted with a drying tube (DRIERITE). Triflic acid (90 μl) was added via syringe. The solution turned slightly orange. The reaction was let to run for 24 hours. After this time, 1,3-divinyltetramethyldisilazane (100 μl) was added via syringe and this removed the color within 2 minutes. The mixture was allowed to stand for one hour, then the crude product was precipitated once from THF (1200 ml)/ethanol (3000 ml). The remaining solvent in the precipitate was removed under reduced pressure. In this way, 328 g, 82% yield of colorless polymer $M_w/M_n$=200,000/130,000, $T_g$=−123° C. was obtained. $^1$H NMR (CDCl$_3$, 300 MHz) δ: 0.05(s, 260H), 0.45–0.50(m, 4H), 1.24(bs, 12H), 1.36(bs, 4H). $^{13}$C NMR (CDCl$_3$, 75.5 MHz) δ: 0.54, 1.02, 1.53, 17.25, 20.81, 23.14, 24.56, 25.60, 29.32, 29.56, 29.85, 33.38. $^{29}$Si NMR (CDCl$_3$, 60.0 MHz) δ: −22.09, −21.84, −21.41, −21.14, 7.06, 7.32, 7.66. IR ν: 2964, 2927, 2858, 1412, 1260, 1095, 1019, 865, 797, 703, 665, 506 cm$^{-1}$.

4.2 Cationic ROP of Polymer/Polymer Mixtures

Copoly(1,3-disiloxanylene-alt-1,10-decanylene) (190 g), poly(hydromethylsiloxane) (184 g, DP 40), octamethylcyclotetrasiloxane (240 g), anhydrous toluene (240 ml) and a TEFLON coated magnetic stir bar were added to an oven dried 2 L two-necked round-bottomed flask. The flask was fitted with a rubber septum, flushed with dry nitrogen and then fitted with a drying tube (DRIERITE). Triflic acid (100 μl) was added via syringe. The slightly orange and cloudy solution turned clear within 10 minutes. The reaction was let to run for 24 hours. After this time, hexamethyldisilazane (200 μl) was added via syringe and this removed the color within 2 minutes. The mixture was allowed to stand for one hour, then the crude product was precipitated once from THF (1500 ml)/ethanol (3800 ml). The remaining solvent in the precipitate was removed under reduced pressure. In this way, 510 g, 83% yield of colorless polymer, $T_g$=−123° C., was obtained. $^1$H NMR (CDCl$_3$, 300 MHz) δ: 0.00–0.18 (m, 28.6H), 0.49–0.57(m, 2H), 1.25–1.27(m, 10H), 4.64–4.71 (m, 2H). $^{13}$C NMR (CDCl$_3$, 75.5 MHz) δ: 0.08, 0.21, 0.99, 18.08, 18.27, 23.15, 23.23, 29.43, 29.69, 33.49. $^{29}$Si NMR (CDCl$_3$, 60.0 MHz) δ: −38.24 to −34.22(m), −22.07 to −21.26(m), −20.65 to −19.95(m), −19.27 to −18.47(m), 6.98–8.17(m), 9.28–10.38(m). IR ν: 2962, 2924, 2856, 2159, 1459, 1411, 1260, 1093, 1037, 912, 879, 828, 800, 762, 705, 509 cm$^{-1}$.

4.3 Anionic ROP of Monomers 1,1,3,3-Tetramethyl-1,3-disila-2-oxacyclononane (94 g, 0.44 mol), octamethylcyclotetrasiloxane (332 g, 1.11 mol), 1,3-divinyltetramethyldisiloxane (15 g, 0.08 mol) and a TEFLON coated magnetic stir bar were added to an oven dried 250 ml two-necked round-bottomed flask. The flask was fitted with a rubber septum, flushed with dry nitrogen and then fitted with a drying tube (DRIERITE). Potassium silanolate/toluene mixture (0.2 ml) was added to the mixture and the flask's contents were heated to 140° C. and was let to run for 28 hours. After this time, residual cyclic material was extracted from the polymer using hot ethanol. In this way, 330 g, 75% yield of colorless polymer $M_w/M_n$=15,800/6100, $T_g$=−123° C. was obtained. $^1$H NMR (CDCl$_3$, 300 MHz) δ: 0.05(s), 0.06(s), 0.08(s), 0.10(s), 0.51–0.56(m), 0.61–0.65(m), 1.31(bs), 1.43–1.47(m), 1.55–1.61(m), 5.74 (dd, J=4 and 20 Hz), 5.94(dd, J=4 and 15 Hz), 6.14(dd, J=15 and 20 Hz). $^{13}$C NMR (CDCl$_3$, 75.5 MHz) δ: 0.26, 0.78, 15.02, 16.12, 18.33, 21.41, 23.20, 25.22, 27.04, 33.25, 111.40, 131.62. $^{29}$Si NMR (CDCl$_3$, 60.0 MHz) δ: −21.86, −21.40, 6.83–7.04(m). IR ν: 2963, 2925, 2907, 2858, 1446, 1411, 1261, 1095, 1020, 864, 805, 701, 665, 507 cm$^{-1}$.

Example 5
Compounding Functional Silalkylenesiloxane Copolymers with Silica and Poly(hydromethylsiloxane-co-dimethylsiloxane) Crosslinkers Treated fumed silica (DeGussa R812 S or Cabot TS-530) was compounded into vinyidimethylsilyl terminated silalkylenesiloxane copolymers using a tangential sigma blade mixer. Throughout mixing, the mixer's bowl was heated to 140° C. using circulated oil. After all of the silica had been added incrementally to the copolymer fluids, the gum was mixed for at least 2 hours. All other ingredients were added to the base rubber using a three roller mill. Test slabs were cured in a heated press at 150° C. for five minutes, and post cured in a circulating air oven at 150° C. for 2 hours. Before mechanical testing, the slabs were allowed to relax at room temperature for at least 24 hours. The following Table 2 gives three formulation examples and mechanical results for each.

TABLE 2

|  | Example 5.1 | Example 5.2 | Example 5.3 |
|---|---|---|---|
| Total wt. % HC in final crosslinked elastomer | 26% | 19% | 5% |
| $M_n$ of first vinyl terminated silalkylenesiloxane copolymer | $M_n$ 40,000 (93 parts) | $M_n$ 60,000 (95 parts) | $M_n$ 90,000 (26 parts) |
| wt. % HC in first copolymer | 39% | 29% | 0 |
| $M_n$ of second (silanol) terminated silalkylenesiloxane copolymer | $M_n$ 180 (3 parts) | $M_n$ 180 (2.9 parts) | — |
| $M_n$ of second (vinyl) terminated silalkylenesiloxane copolymer | — | — | $M_n$ 60,000 (70 parts) |
| wt. % HC in second copolymer | 39% | 39% | 10.6% |

TABLE 2-continued

| | Example 5.1 | Example 5.2 | Example 5.3 |
|---|---|---|---|
| Silica type | Cabot TS-530 | Cabot TS-530 | DeGussa R812 S |
| Silica loading, pphr | 52 | 52 | 41 |
| Poly(hydromethylsiloxane-co-dimethylsiloxane) (Si-H crosslinker) | 4 parts | 2.1 parts | 4 parts |
| Crosslinker Equiv. Wt. | 6 mmol/g | 6 mmol/g | 3 mmol/g |
| 1,3,5,7-tetravinyl-1,3,5,7-tetramethyl cyclotetrasiloxane (Inhibitor) | 0.4 pphr | 0.4 pphr | 0.4 pphr |
| 5% Pt complex (platinum 1,3-divinyl-1,1,3,3-tetramethyldisiloxane) in xylenes | 2 pphr | 2 pphr | 2 pphr |
| Ultimate Tensile Strength (psi) per ASTM D-412 | — | 1220 | 1516 |
| Elongation at break (%) per ASTM D-412 | — | 526 | 1018 |
| Tear (Die B ppi) per ASTM D-624 | — | 231 | 248 |
| Hardness (Shore A points) per ASTM D-2240 | — | 54 | 50 |

The interaction between the copolymers and the fumed silica is important to the reinforcement of the cured elastomer. Example 5.1 utilized a, copolymer as shown in formula 6:

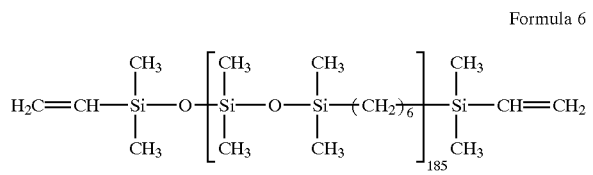

Formula 6 which contained only one disiloxane unit (1.5 D) per hexanylene unit. This material provided little to no interaction with the fumed silica filler. Thus, this material had poorer mechanical properties. Example 5.2 used a copolymer shown formula 7 below:

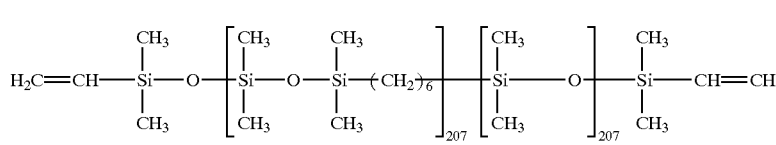

Formula 7 which had an average dimethylsiloxane unit length of 2.5 D. The mechanical strength of Example 5.2 is comparable to addition cured silicone rubber known in the art. This demonstrates that there exists a minimum dimethylsiloxane unit block length which will facilitate reinforcement of the cured rubber by treated fumed silica. Example 5 shows that minimum to be an average of 2.5 D units, as shown in formula 8 below.

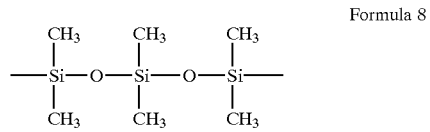

Formula 8

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. It is to be understood, therefor, that other expedients known to those skilled in the art or disclosed herein, may be employed without departing from the invention or the scope of the appended claims.

What is claimed is:

1. A silalkylenesiloxane copolymer of the formula:

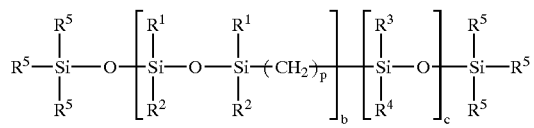

wherein p is at least 2, b is at least 1, the sum of b and c is greater than 300, and each of $R^1$, $R^2$, $R^3$, $R^4$, and $R^5$ group is an independently selected monovalent organic group; and said silalkylenesiloxane copolymer is compounded with a silica filler.

2. The copolymer of claim 1 wherein p is at least 6.

3. The copolymer of claim 1, wherein the sum of b and c is 1000 to 5000.

4. The copolymer of claim 1 which is crosslinked.

5. A reinforced crosslinked material prepared from a silica filler and a crosslinked silalkylenesiloxane copolymer of the formula:

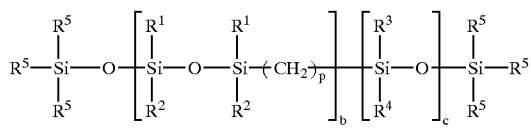

wherein p is at least 6, b is at least 1, c is zero or greater, and each each $R^1$, $R^2$, $R^3$, $R^4$, and $R^5$ group is an independently selected monovalent organic group.

6. A reinforced crosslinked material preparable from a silica filler and a crosslinked silalkylenesiloxane copolymer of the formula:

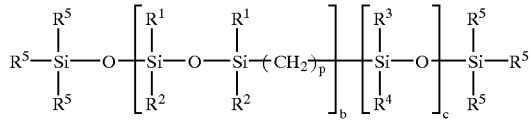

wherein p is at least 2, b is at least 1, the sum of b and c is greater than 300, and each $R^1$, $R^2$, $R^3$, $R^4$, and $R^5$ group is independently selected monovalent organic group.

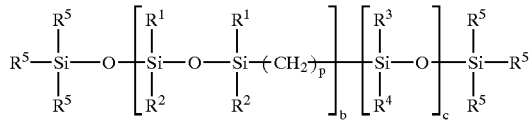

wherein p is at least 2, b is at least 1, c is zero or greater, and each $R^1$, $R^2$, $R^3$, $R^4$, and $R^5$ group is independently a monovalent organic group.

7. A method for preparing a silalkylenesiloxane copolymer of Formula 5:

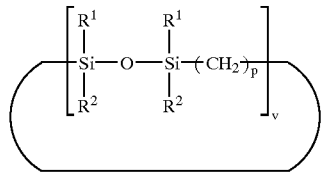 + 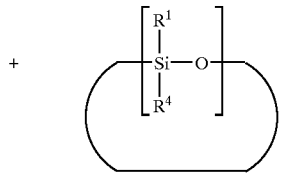 + 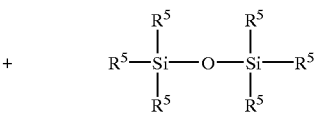

Formula A      Formula B      Formula C

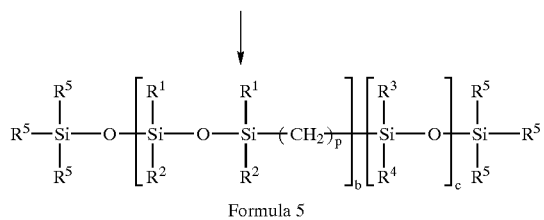

Formula 5 wherein p is at least 2, b is at least 1, c is at least 1, V is at least 2, X is at least 3, and each $R^1$, $R^2$, $R^3$, $R^4$, and $R^5$ group is an independently selected monovalent organic group;
the method comprising combining at least one compound having at least one silalkylenesiloxane unit of Formula A and at least one compound having at least one siloxane unit of Formula B, and a sufficient amount of the siloxane of Formula C with a catalyst to produce said silalkyenesiloxane copolymer of Formula 5.

8. The method of claim 7 wherein the catalyst is an acidic or basic compound.

9. A silalkylenesiloxane copolymer prepared by the method of claim 7.

10. A method for preparing a silalkylenesiloxane copolymer of the formula:

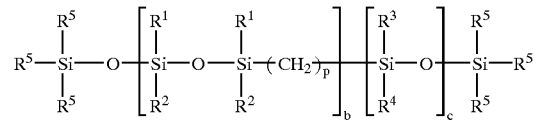

wherein p is at least 2, b is at least 1, c is zero or greater, and each $R^1$, $R^2$, $R^3$, $R^4$, and $R^5$ group is independently a monovalent organic group; the method comprising combining at least one cyclic silalkylenesiloxane monomer of Formula 4 with a catalyst Formula 4

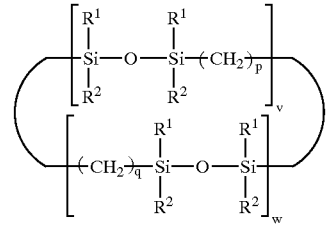

Wherein p and q are each at least 2, v and w are each at least 1, with the provision that q does not equal p for at least one set of silalkylenesiloxane repeat units, and each $R^1$ and $R^2$ group is independently a monovalent organic group.

11. The method of claim 10, wherein the catalyst is an acidic or basic compound.

12. A silalkylenesiloxane copolymer prepared by the method of claim 10.

13. A method for preparing a silalkylenesiloxane copolymer of the formula:

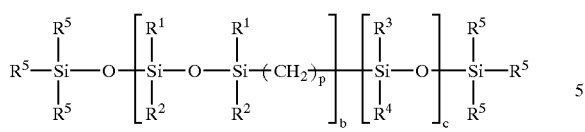

wherein p is at least 2, b is at least 1, c is at least 1, and each of $R^1$, $R^2$, $R^3$, $R^4$ and $R^5$ is independently a monovalent organic group; the method comprising combining at least one compound having at least one silalkylenesiloxane unit of Formula 1 or Formula 2:

Formula 1

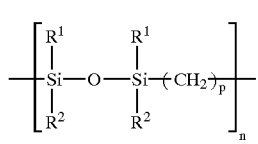

Formula 2

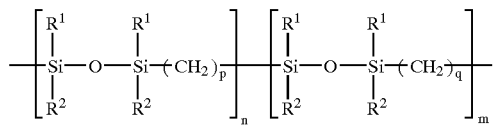

wherein p and q are each at least 2, and n and m are each at least 1.

14. A method for preparing a silalkylenesiloxane copolymer, comprising combining at least one compound having at least one siloxane unit with a symmetric cyclic silalkylenesiloxane monomer having the following formula:

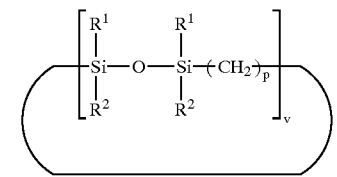

wherein p is at least 2, v is at least 1, and each $R^1$ and $R^2$ group is independently a monovalent organic group.

15. A method for preparing a silalkylenesiloxane copolymer comprising combining at least one compound having at least one siloxane unit with an asymmetric cyclic silalkylenesiloxane monomer having the following formula:

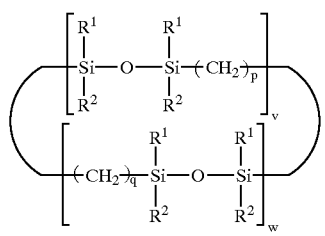

wherein p and q are each at least 2, v and w are each at least 1, with the proviso that q does not equal p for at least one set of silalkylenesiloxane repeat units, and each $R^1$ and $R^2$ group is independently a monovalent organic group.

16. The method of claim 14 or claim 15 wherein the compound having at least one siloxane unit is a cyclic siloxane monomer.

17. A silalkylenesiloxane copolymer prepared by the method of claim 15 or claim 16.

* * * * *

UNITED STATES PATENT AND TRADEMARK OFFICE
CERTIFICATE OF CORRECTION

PATENT NO. : 6,534,587 B1  Page 1 of 1
APPLICATION NO. : 09/568200
DATED : March 18, 2003
INVENTOR(S) : Mark A. Tapsak, Edward DiDomenico and David L. Miller It is certified that error appears in the above-identified patent and that said Letters Patent is hereby corrected as shown below:

On the title page; item [75]:
Add Inventor:   David L. Miller, Circle Pines, MN

| | |
|---|---|
| Col. 23, Line 24 | ….."is independently"   should read   ….--is an independently-- |
| Col. 23, Line 26 | ….claim 6, drawing with description printed twice, delete 2nd drawing. |
| Col. 26, Line 36 | …."claim 15 or claim 16" should read   ….--claim 14 or claim 15-- |

Signed and Sealed this

Twenty-fifth Day of December, 2007

JON W. DUDAS
*Director of the United States Patent and Trademark Office*